(No Model.) 2 Sheets—Sheet 1.
I. T. DYER.
AIR COMPRESSING APPARATUS.
No. 585,090. Patented June 22, 1897.
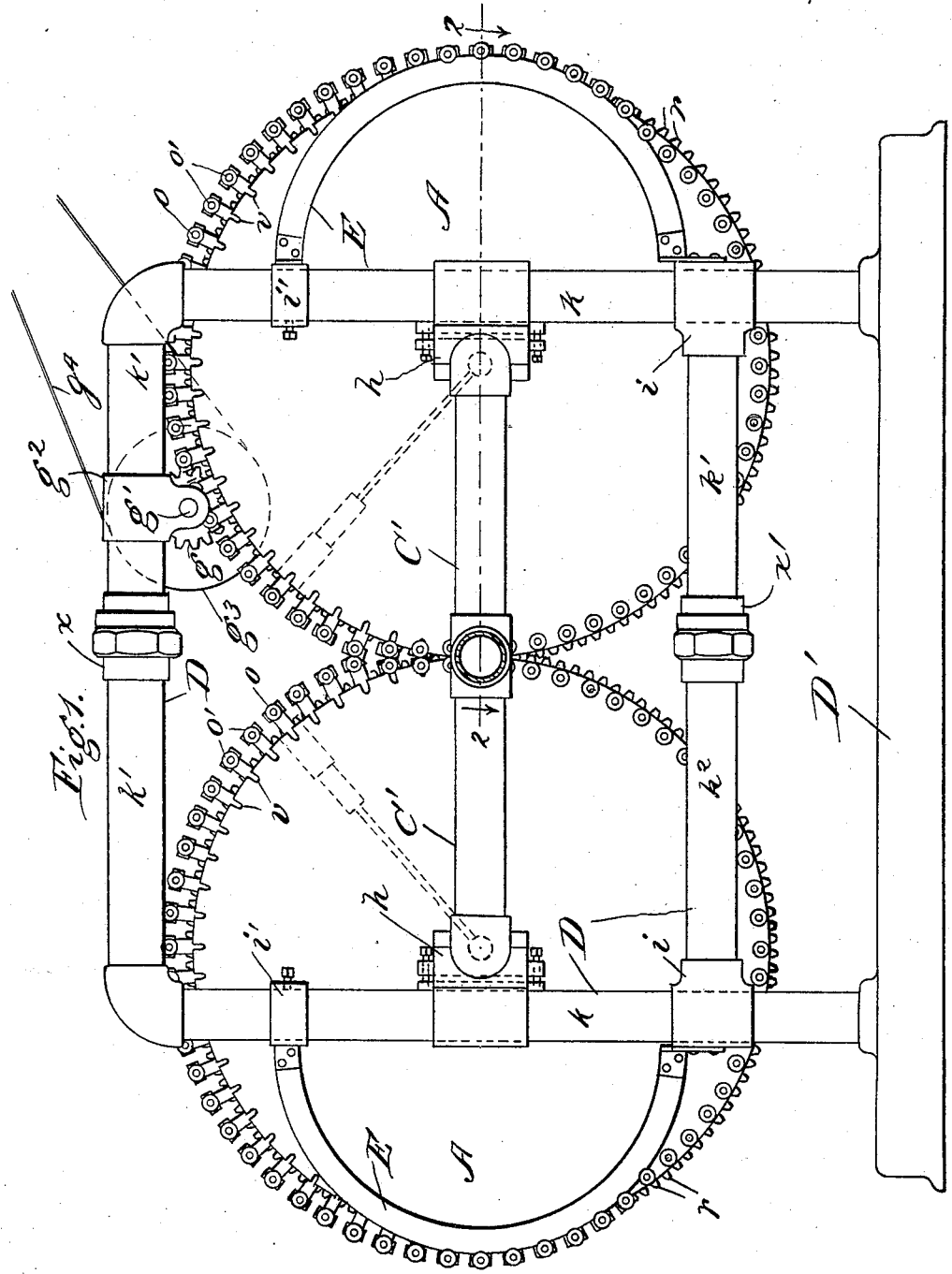
Witnesses:
John H. Lee
Richard Spencer
Inventor:
Isaac T. Dyer,
By Dyrenforth and Dyrenforth,
Attys.

(No Model.) 2 Sheets—Sheet 2.
I. T. DYER.
AIR COMPRESSING APPARATUS.
No. 585,090. Patented June 22, 1897.
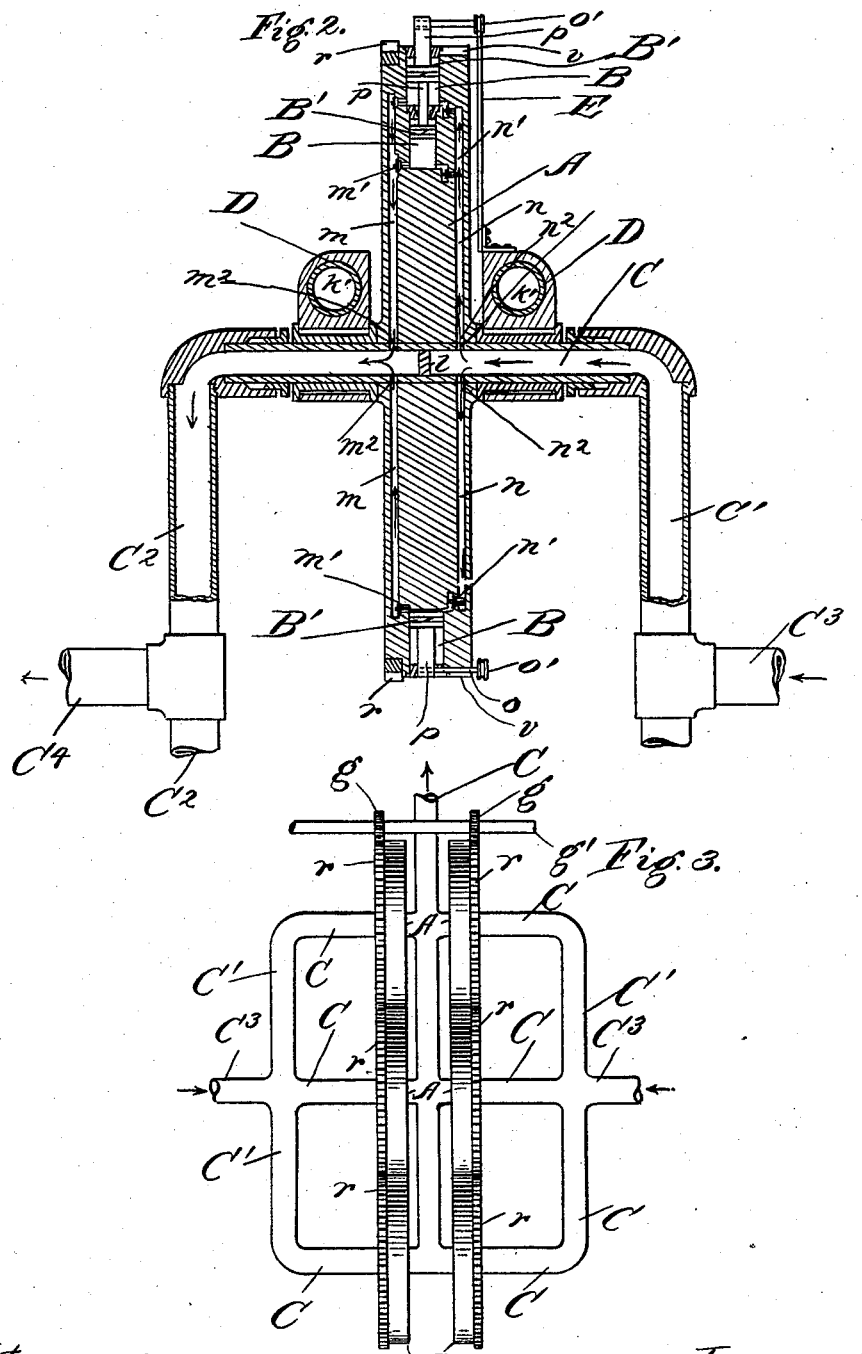
Witnesses: John H. Lee. Richard Spencer.
Inventor: Isaac T. Dyer, By Dyrenforth and Dyrenforth, Att'ys.

UNITED STATES PATENT OFFICE.

ISAAC T. DYER, OF CHICAGO, ILLINOIS, ASSIGNOR, BY DIRECT AND MESNE ASSIGNMENTS, TO THE DYER POWER COMPANY, OF SAME PLACE.

AIR-COMPRESSING APPARATUS.

SPECIFICATION forming part of Letters Patent No. 585,090, dated June 22, 1897.

Application filed June 9, 1896. Serial No. 594,833. (No model.)

*To all whom it may concern:*

Be it known that I, ISAAC T. DYER, a citizen of the United States, residing at Chicago, in the county of Cook and State of Illinois, have invented a new and useful Improvement in Air-Compressing Apparatus, of which the following is a specification.

My invention relates to an improvement in the class of air-compressors involving a rotary head containing a circumferential series of cylinders, each having a valve-equipped inlet communicating with the outer air and a valve-equipped outlet leading to the place of storage or use of the compressed air and each containing a piston, the pistons being actuated, one after the other, by rotating the head, to draw air into the cylinders and discharge it from the latter under high pressure for use as power.

The object of my improvement is to greatly multiply the air-compressing action of an apparatus of the kind to which my invention relates without, to that end, requiring a great increase in the power for operating it. This I accomplish by providing two, and preferably three, of the rotary compressors, geared together in series, so that by applying the driving power to one all will be driven, and causing their pistons to engage each other from one to the other in pairs, when brought into relative abutment, to coact one upon the other and each thus force the other into its respective cylinder to produce its inward air-compressing stroke.

Referring to the accompanying drawings, Figure 1 shows my improved apparatus in its simpler form by a view in side elevation, partly sectional. Fig. 2 is a broken section taken on the line 2 2 on Fig. 1 and viewed in the direction of the arrows; and Fig. 3, a diagrammatic plan view illustrating my improvement, with three of the rotary compressors geared together in series, two sets of the series of three compressors being shown, each provided with its separate air-inlet and with an outlet common to both.

Each of the rotary air-compressors involves the same construction. Hence the following detailed description of one will suffice for all, and corresponding parts in the different compressors are denoted by the same reference-letters.

A is a disk-shaped cast-metal head having a circumferential series of gear-teeth $r$ and a central opening, at which it is journaled in the manner hereinafter described. In the head are formed chambers or cylinders B, equidistant apart in circumferential series, each extending from the perimeter of the head radially inward and containing a piston B', provided with a stem $p$, having extended laterally at a right angle from its outer end an arm $o$, carrying an antifriction-roller $o'$, and at the outer end of each cylinder the periphery of the head is recessed, as shown at $v$, the recess extending parallel with the adjacent arm $o$ and in alinement therewith to admit it at the end of the inward stroke of the piston. Leading from the opposite sides of the base of each cylinder B into the opening at the center of the head A are the radial inlet-passage $n$ and outlet-passage $m$, communication between which and the cylinder is controlled, respectively, by an inwardly-opening check-valve $n'$ and an outwardly-opening check-valve $m'$.

The head A is journaled at its open center on a hollow stationary shaft C, into which the passages $n$ and $m$ open through ports $n^2$ and $m^2$, separated from each other by a diaphragm $l$ in the hollow shaft, the latter communicating at one end with the open air (or other supply of fluid to be compressed) and at its opposite end with the receiver for the compressed fluid.

At least two of the rotary pump-heads A are essential, according to my invention, and they require to be journaled in such relation as to cause their gear-teeth $r$ to intermesh, so that by rotating one head the other will thereby also be rotated in a manner to bring each piston-stem $p$ on one head, as the perimeters of the heads in the rotation of the latter approach each other, into engagement with the piston-stem thereby brought into opposition to it, whereby each forces the other inward into its cylinder and compresses out, past the respective valve $m'$, through the passage $m$, into the discharge side of the hollow shaft C, the air drawn into the cylinder, through the passage $n$, past the valve $n'$, by the outward stroke of the piston, produced by engagement of the piston-stem with a stationary cam, as hereinafter described.

To support the rotary compressors to adapt them to coöperate in the manner explained, a frame D, such as that shown in Figs. 1 and 2 and supported on a base D', is provided. The frame illustrated is formed of tubular posts or standards $k$, rising from the base D' and connected to brace them at their upper ends by tubular cross-bars $k'$, coupled together where they meet, as shown at $x$, and near their lower ends by similar cross-bars $k^2$, extending toward each other from collars $i$, adjustably supported on the posts, the bars $k^2$ being coupled together, as shown at $x'$, where they meet.

Owing to the nature of the view selected for illustration in Fig. 1 only one side of the frame D is presented. It will be understood, however, that the opposite side of the frame may be composed of counterparts of the posts $k$, having coupled connections $k'$ at their upper ends and coupled connections $k^2$ near their lower ends, though not necessarily fastened to the posts by means of adjustable collars $i$.

In suitable bearings $h$ on each pair of the posts $k$ at opposite ends of the frame D is stationarily supported a hollow shaft C, and on each shaft is journaled at its center a head A in position to cause the gear-teeth on the respective heads to intermesh, as represented in Fig. 1, so that by driving one, as through the medium of a pinion $g$, supported to mesh with its gear-teeth on a rotary shaft $g'$, journaled in suitable bearings $q^2$ on the cross-bars $k'$ and carrying a drive-pulley $g^3$, connected by a belt $g^4$ with the driving power, (not shown,) the other will also be driven.

Each hollow shaft C has tubular arms C' and C² extending at right angles from its opposite ends across the sides of each head A, the arms C' of the two heads being coupled where they meet to an air-inlet pipe C³, and the arms C² thereof being coupled where they meet to an outlet-pipe C⁴, leading to the compressed-air receiver. (Not shown.)

From each collar $i$ there extends outward into the path of the rollers $o'$ on the shafts $o$, which project from the piston-stems, as described, a rigid bow-shaped cam E, the upper end of which is fastened to a collar $i'$, adjustably secured upon a post $k$ near its upper end, whereby the collars $i$ and $i'$ may be raised and lowered to set them on the posts for adjusting the cam with relation to the path of the rollers $o'$. These cams are encountered by the rollers in the rotation of the heads A to withdraw the pistons B', and thereby effect their outward strokes for drawing into the cylinders B, through the inlet C³, arms C', shafts C, and passages $n$, the supply of air to be compressed by engagement of opposing piston-stems to effect the inner strokes of their respective pistons, in the manner described, to compress the air out of the cylinders through the passages $m$, shafts C, arms C², and outlet C⁴.

In the same manner that two of the rotary compressors are thus caused to coöperate three may be combined by supporting one head A between two others in a manner to engage the outer ones at their gear-teeth with the gear-teeth on the intermediate compressor at opposite sides of its center. This arrangement, which doubles the capacity of the apparatus formed with only two of the rotary heads, is illustrated diagrammatically in Fig. 3, wherein two sets, each composed of three of the compressors thus combined, are presented, with pinions $g\,g$, on a driving-shaft $g'$, engaging the gear-teeth on two of the rotary compressors at corresponding ends of the sets thereof. With this arrangement each head is journaled on a hollow shaft C, and these shafts communicate with inlets C³ through branch arms C', while they all discharge into a common outlet C⁴.

The invention thus described is herein entitled and referred to throughout the specification as a "rotary" air-compressor. It may be employed also, however, for compressing fluids generally, thus liquid (especially water) as well as gaseous fluids. Hence it is to be understood as intended for use generally as a rotary fluid-compressor.

Moreover, the details of construction, as shown and described, while they are believed to afford the best construction of the apparatus, may be variously departed from without departure from the invention, which is accordingly not intended to be limited to such particular details, except in those of the appended claims, wherein they are specifically set forth.

What I claim as new, and desire to secure by Letters Patent, is—

1. Rotary fluid-compressors, comprising rotary heads each containing a circumferential series of radial cylinders having valve-controlled inlets and outlets and provided with pistons on stems, said heads being geared together to cause the rotation of one to drive all and to cause the piston-stems on the respective heads to engage each other in pairs, as the piston-stems approach each other during the rotation of the heads, and thereby produce the inward strokes of the pistons, substantially as and for the purpose set forth.

2. Rotary fluid-compressors, comprising rotary heads each containing a circumferential series of radial cylinders having valve-controlled inlets and outlets and provided with pistons on stems, said heads being geared together to cause the rotation of one to drive all and to cause the piston-stems on the respective heads to engage each other in pairs, as the piston-stems approach each other during the rotation of the heads, and thereby produce the inward strokes of the pistons, and cams so situated as to be engaged by the piston-stems in the rotation of the heads to produce the outward strokes of the pistons, substantially as and for the purpose set forth.

3. Rotary fluid-compressors, comprising rotary heads each containing a circumferential series of radial cylinders having valve-controlled inlets and outlets and provided with pistons on stems having arms extending laterally from their outer ends and carrying rollers, said heads being geared together to cause the rotation of one to drive all and to cause the piston-stems on the respective heads to engage each other in pairs, as the piston-stems approach each other during the rotation of the heads, and thereby produce the inward strokes of the pistons, and bow-shaped cams adjustably supported in the paths of said rollers to be engaged thereby in the rotation of the heads and produce the outward strokes of the pistons, substantially as and for the purpose set forth.

4. Rotary fluid-compressors, comprising in combination with a supporting-frame stationary hollow shafts C each containing a diaphragm $l$, and communicating at its opposite ends respectively with the inlets and outlets for the fluid, heads A journaled on said shafts each head containing a series of radial cylinders B having passages $n$ and $m$ controllably communicating with the cylinders through the medium of valves $n'$ and $m'$ and leading into said shaft respectively at opposite sides of the diaphragm, and pistons B' in the cylinders on stems, said heads being geared together to cause the rotation of one to drive all and to cause the piston-stems on the respective heads to engage each other in pairs, as the pistons approach each other during the rotation of the heads, and thereby produce the inward strokes of the pistons, substantially as and for the purpose set forth.

5. Rotary fluid-compressors, comprising in combination with a supporting-frame having posts rising from a base stationary hollow shafts C each containing a diaphragm $l$ and supported in bearings on said posts, tubular arms C' and C² extending at right angles from said shaft at its opposite ends and provided at their extremities respectively with the inlet C³ and outlet C⁴, heads A journaled on the shafts between said arms and each containing a series of radial cylinders B having passages $n$ and $m$ controllably communicating with the cylinders through the medium of valves $n'$ and $m'$ and leading into shafts C respectively at opposite sides of their contained diaphragms, and pistons B' in the cylinders on stems, said heads being geared together to cause the rotation of one to drive all and to cause the piston-stems on the respective heads to engage each other in pairs, as the piston-stems approach each other during the rotation of the heads, and thereby produce the inward strokes of the pistons, and driving means applied to one of said heads, substantially as and for the purpose set forth.

6. Rotary fluid-compressors, comprising in combination with a supporting-frame having posts rising from a base stationary hollow shafts C each containing a diaphragm $l$ and supported in bearings on said posts, tubular arms C' and C² extending at right angles from said shaft at its opposite ends and provided at their extremities respectively with the inlet C³ and outlet C⁴, heads A journaled on the shafts between said arms and each containing a series of radial cylinders B having passages $n$ and $m$ controllably communicating with the cylinders through the medium of valves $n'$ and $m'$ and leading into shafts C respectively at opposite sides of their contained diaphragms, pistons B' in the cylinders on stems $p$ having arms $o$ extending laterally from their outer ends and carrying rollers $o'$, said heads being geared together to cause the rotation of one to drive all and to cause the piston-stems on the respective heads to engage each other in pairs, as the pistons approach each other during the rotation of the heads, and thereby produce the inward strokes of the pistons, and cams E adjustably supported on said posts to extend into the paths of said rollers, substantially as and for the purpose set forth.

7. A rotary fluid-compressor comprising, in combination, three rotary heads each containing a circumferential series of radial cylinders having valve-controlled inlets and outlets and provided with pistons on stems, said heads being journaled in series and geared together to cause the rotation of one to drive all and to cause the piston-stems at opposite points on the perimeter of the middle head to engage with those brought coincident with them on the outer heads, as the piston-stems on the perimeters of the heads, in the rotation of the latter, approach each other, and thereby produce the inward strokes of the pistons, and driving means applied to one of said heads, substantially as and for the purpose set forth.

ISAAC T. DYER.

In presence of—
J. H. LEE,
R. T. SPENCER.